US010785398B1

(12) United States Patent
Bukolt (10) Patent No.: US 10,785,398 B1
(45) Date of Patent: Sep. 22, 2020

(54) MOBILE VIDEO RECORDER APPARATUS

(71) Applicant: Dieter B. Bukolt, Stoughton, WI (US)

(72) Inventor: Dieter B. Bukolt, Stoughton, WI (US)

(*) Notice: Subject to any disclaimer, the term of this patent is extended or adjusted under 35 U.S.C. 154(b) by 0 days.

(21) Appl. No.: 16/896,420

(22) Filed: Jun. 9, 2020

(51) Int. Cl.
| | |
|---|---|
| H04N 5/225 | (2006.01) |
| H04N 5/232 | (2006.01) |
| H04N 1/00 | (2006.01) |
| H04N 1/32 | (2006.01) |
| H04N 1/21 | (2006.01) |
| H04W 4/00 | (2018.01) |
| H04W 4/18 | (2009.01) |
| G03B 17/56 | (2006.01) |
| G03B 19/00 | (2006.01) |

(52) U.S. Cl.
CPC ....... *H04N 5/23206* (2013.01); *G03B 17/563* (2013.01); *H04N 5/2252* (2013.01); *H04N 5/2257* (2013.01); *H04N 5/23222* (2013.01)

(58) Field of Classification Search
CPC ........... H04N 5/23206; H04N 5/23222; H04N 5/2252; H04N 5/2257; H04N 5/32406; H04N 1/32411; H04N 1/00315; H04N 1/212; H04W 4/00; H04W 4/18; G06F 8/44; G03B 17/563; G03B 19/00
USPC ......... 725/105, 20, 67, 68, 98, 99, 118, 148, 725/150, 62; 348/372, 14.02, 211.2, 348/211.3, 373–376, 469, 429.1, 432.1, 348/460, 608, 642, 695; 375/220, 352, 375/265, E7.016, E7.13, E7.015; 455/7, 455/13.1, 556.1; 341/143, 160; 396/183, 396/465, 466, 535; 370/395.5, 395.52, 370/466, 467, 300, 395.64; 707/914
See application file for complete search history.

(56) References Cited

U.S. PATENT DOCUMENTS

| | | | |
|---|---|---|---|
| 7,911,509 B2* | 3/2011 | Jendbro | H04N 5/76 348/231.6 |
| 7,978,263 B2* | 7/2011 | Eldon | H04N 5/225 348/373 |

(Continued)

OTHER PUBLICATIONS

BOSCH Invented for life Flexidome IP micro 3000i brochure; Bosch Security Systems 2020; 2020.

(Continued)

*Primary Examiner* — Marly S Camargo
(74) *Attorney, Agent, or Firm* — James A. Joyce; Godfrey & Kahn, S.C.

(57) ABSTRACT

A mobile video camera apparatus is provided having a mobile video camera device that includes a housing, a handle with a base engagement portion, a camera including an image sensor, a lens, and an encoder, a battery, a recording activation switch, an input relay connected to the camera, wherein activation of the recording activation switch by a user energizes the input relay, and the input relay provides a signal to the camera to begin recording data, a wireless communication device coupleable to the camera device for transmitting encoded data from the camera to the video management system and for receiving configuration commands from the video management system. The apparatus further including a base having a handle mount for receiving and securing the base engagement portion to the base, wherein the handle mount includes a tool-less coupling mechanism for securing and unsecuring the mobile video camera device to the base.

10 Claims, 8 Drawing Sheets

(56) References Cited

U.S. PATENT DOCUMENTS

| | | | |
|---|---|---|---|
| 8,391,921 B2* | 3/2013 | Moran | H04M 1/00 455/556.1 |
| 10,272,848 B2* | 4/2019 | Troxel | B60R 11/04 348/148 |
| 10,326,965 B2* | 6/2019 | Siann | H04N 7/188 348/143 |
| 2001/0050875 A1* | 12/2001 | Kahn | H04N 1/2112 348/261 |
| 2002/0071662 A1* | 6/2002 | Tatsumi | H04N 7/04 386/100 |
| 2003/0107655 A1* | 6/2003 | Ishizaka | H04N 5/232 348/207.99 |
| 2006/0235755 A1* | 9/2006 | Ju | H04N 19/109 375/240.12 |
| 2009/0189981 A1* | 6/2009 | Siann | H04N 7/188 348/143 |
| 2010/0110192 A1* | 5/2010 | Johnston | H04N 5/23293 348/211.4 |
| 2013/0260296 A1* | 10/2013 | Fukushima et al. | H04N 21/238 725/62 |
| 2015/0011257 A1* | 1/2015 | Hsu | H04M 1/725 455/556.1 |
| 2016/0119517 A1* | 4/2016 | Topliss | H04N 5/2259 348/374 |
| 2016/0205301 A1* | 7/2016 | Park | H04N 5/2256 348/211.2 |

OTHER PUBLICATIONS

Ip-link 200Mbps Wireless N Nano Router; product highlights, features, and specifications manual; 2017.

Videotag VT-100 product information brochure; Motorola Solutions; 2020.

6mm Hazardous Location Interface Relays—RV8H Series product brochure; IDEC Corporation; 2013.

U19C2R Latching Push Button Switch Black Metal Shell with Re LED Ring for 19mm Hole product information sheet; Ulincos; 2015.

Website screenshot www.axis.com/newsroom/press-releaes/body-wom-flexible-solution; Axis Communications AB; captured Jun. 8, 2020.

* cited by examiner

MOBILE VIDEO RECORDER APPARATUS

FIELD OF THE INVENTION

The mobile video recorder apparatus relates generally to the field of video recorders and video data transmission. More particularly, the present invention relates to a mobile video camera apparatus.

BACKGROUND

Currently available wireless cameras can provide event recording, but include several limitations related to portability, security, usability, and communication, among other things. It is desirable to provide a new design to obviate one or more limitations found in the prior art.

SUMMARY OF THE INVENTION

The apparatus can be understood by referring to the specification, drawings, and claims. In at least some embodiments, a mobile video camera apparatus is provided comprising: a mobile video camera device comprising: a housing; a handle connected to the housing at a first end and having a base engagement portion at a second end: a camera including an image sensor, a lens, and an encoder for receiving and encoding data from the image sensor for transmission to a video management system; a battery; a recording activation switch; an input relay connected to the camera, wherein activation of the recording activation switch by a user energizes the input relay, and the input relay provides a signal to the camera to begin recording data; a wireless communication device coupleable to the camera device for transmitting encoded data from the camera to the video management system and for receiving configuration commands from the video management system; and a base comprising: a handle mount for receiving and securing the base engagement portion to the base, wherein the handle mount includes a tool-less coupling mechanism for securing and unsecuring the mobile video camera device to the base.

In at least some other embodiments, a mobile video camera apparatus is provided comprising: a mobile video camera device comprising: a housing; a handle connected to the housing at a first end and having a base engagement portion at a second end: a camera including an image sensor, a microphone, a lens, and an encoder for receiving and encoding data from the image sensor and microphone for transmission to a video management system; a battery; a housing power port connected to the battery for receiving charging power; a recording activation switch; an input relay connected to the camera, wherein user activation of the recording activation switch energizes the input relay, and the input relay provides a signal to the camera to begin recording data; a first housing communication port connected to the camera; a wireless communication device configured for communication with the video management system; a second housing communication port connected to the wireless communication device and coupleable with the first housing communication port for transmitting encoded data from the camera to the video management system; and a base comprising: a handle mount for selectively receiving and securing the base engagement portion of the handle to the base; a base power output port coupleable to the housing power port; and a base communication port coupleable to the first housing communication port.

In at least some other further embodiments, a mobile video camera apparatus is provided comprising: a mobile video camera device comprising: a housing; a handle connected to the housing at a first end and having a base engagement portion at a second end: a camera including an image sensor, a lens, and an encoder for receiving and encoding data from the image sensor for at least one of storage in a memory device and transmission to a video management system; a battery; a recording activation switch; an input relay connected to the camera, wherein user activation of the recording activation switch energizes the input relay, and the input relay provides a signal to the camera to begin recording data; a wireless communication device coupleable to the camera device for transmitting encoded data from the camera to the video management system and for receiving configuration commands from the video management system; and a base comprising: a handle mount for receiving and securing the base engagement portion to the base, wherein the handle mount includes a tool-less coupling mechanism for securing and unsecuring the mobile video camera device to the base; wherein the housing further includes a first housing communication port connected to the camera and a second housing communication port connected to the wireless communication device and coupleable with the first housing communication port for wirelessly transmitting encoded data from the camera device to the video management system; and wherein the base further includes a base communication port connected to the video management system and coupleable to the first housing communication port for wired transmission of encoded data from the camera to the video management system.

Other embodiments, aspects, and features of the apparatus will be understood and appreciated upon a full reading of the detailed description and the claims that follow.

BRIEF DESCRIPTION OF THE DRAWINGS

Embodiments of the apparatus are disclosed with reference to the accompanying drawings and are for illustrative purposes only. The apparatus is not limited in application to the details of construction or the arrangement of the components illustrated in the drawings. The apparatus is capable of other embodiments or of being practiced or carried out in other various ways.

DETAILED DESCRIPTION

Disclosed herein is a mobile video camera apparatus configured to record video for communication to a video management system. The video management system can include various types of known systems, such as a Bosch Video Management System (BVMS), a Genetec Security Center, etc.

Figures 1, 2, 3:
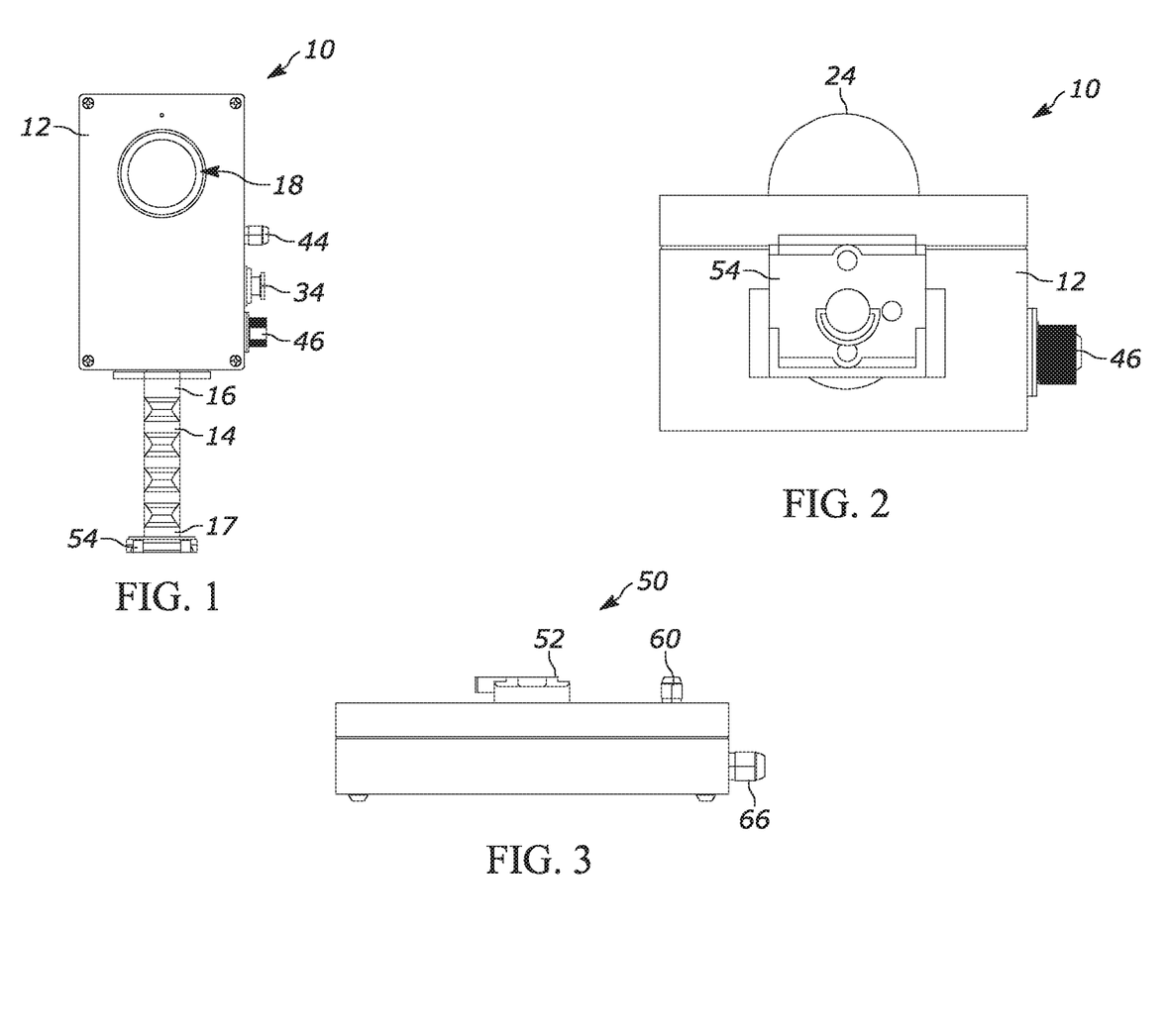
FIG. 1 is a front view of an exemplary mobile video camera device.
FIG. 2 is a top view of the mobile video camera device of FIG. 1.
FIG. 3 is a front view of an exemplary base for use with the video camera device of FIG. 1.

Referring to FIGS. 1 and 2, an exemplary mobile video camera device 10 is illustrated. The mobile video camera device 10 includes a housing 12 secured to a handle 14 at a first end 16. In at least some embodiments, the housing 12 can include various tamper-proof features to protect the integrity of the data obtained, such as security fasteners, warranty labels/tape, etc. The handle 14 further includes a second end 17. A camera 18 is positioned at least partially inside the housing 12 and in at least some embodiments, such as referenced in FIG. 5, includes an image sensor 20, a microphone 22, a lens 24, and an encoder 26 for receiving and encoding data received from the image sensor 20 and microphone 22 for transmission to a video management system 28 or to a memory device 32 (e.g., SD card, hard disk, SSD, etc.) (see FIG. 5) that can be integrated with or coupled to the mobile video camera device 10 to allow the mobile video camera device 10 to record data for later transmission when a wireless connection is not available during recording.

Figure 5:
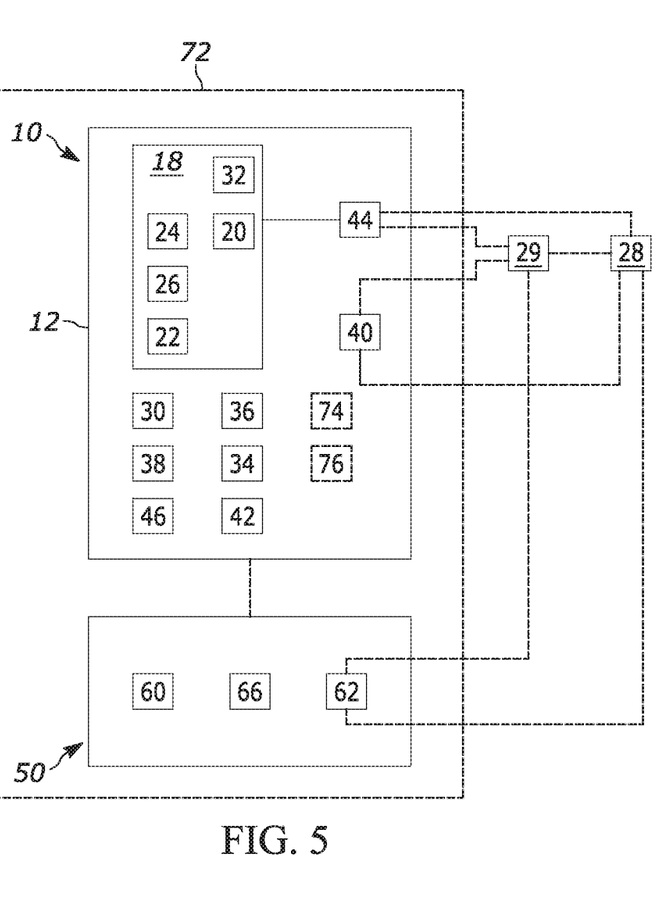
FIG. 5 is a block diagram of an exemplary mobile video camera apparatus that includes the mobile video camera of FIG. 1 and the base of FIG. 3.
Figure 6:
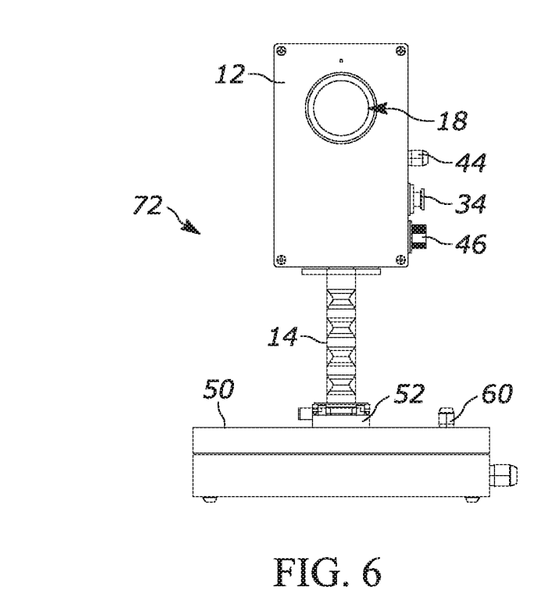
FIG. 6 is a front view of the mobile video camera apparatus that includes the mobile video camera of FIG. 1 and the base of FIG. 3.

The data from the image sensor 20 and/or microphone 22 is received by the encoder 26, which converts it into a digital signal that can then be sent via standard network protocol over a network 29. In at least some embodiments, the digital signal is in ONVIF (Open Network Video Interface Forum) compliant format (e.g., Real-Time Streaming (RTS) protocol), while in other embodiments, other formats can be utilized. In at least some embodiments, the mobile video camera device 10 is a BOSCH FLEXIDOME IP micro 3000i camera. The network 29 can include any one or more of various known types of networks utilized for providing communication between various types of devices.

The mobile video camera device 10 further includes a battery 30 (e.g. a battery pack), such as a lithium ion battery for powering the components therein. The battery 30 can further include or be coupled with circuitry to provide multiple voltage outputs, such as 5 VDC and 12 VDC, as well as under and over charge protection, etc. In addition to the battery 30, the mobile video camera device 10 can include a housing power port 34 (e.g., 12 VDC input) coupled to the battery 30.

Figure 7:
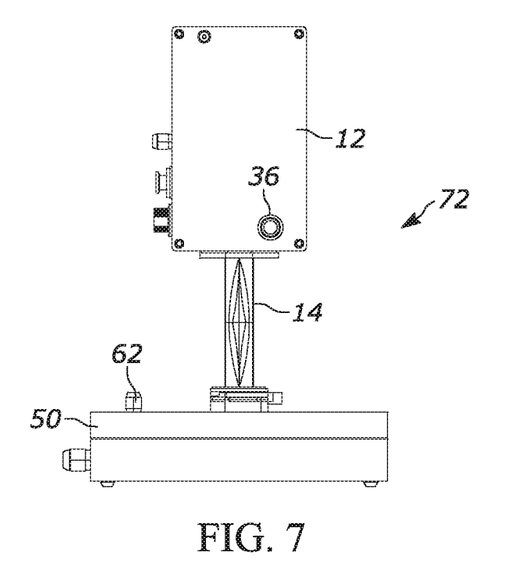
FIG. 7 is a rear view of the mobile video camera apparatus of FIG. 5.
Figure 8:
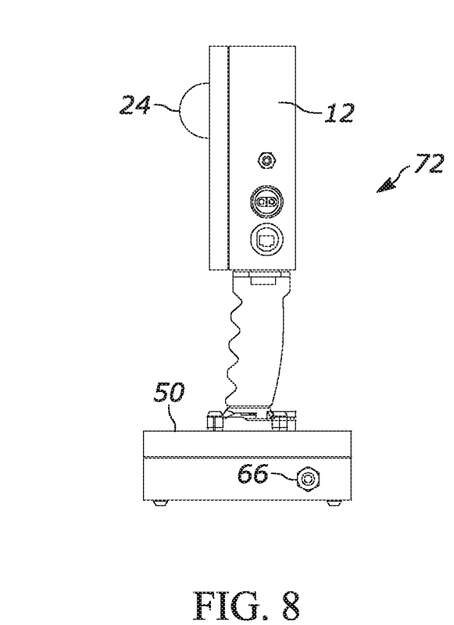
FIG. 8 is a first side view of the mobile video camera apparatus of FIG. 5.
Figure 9:
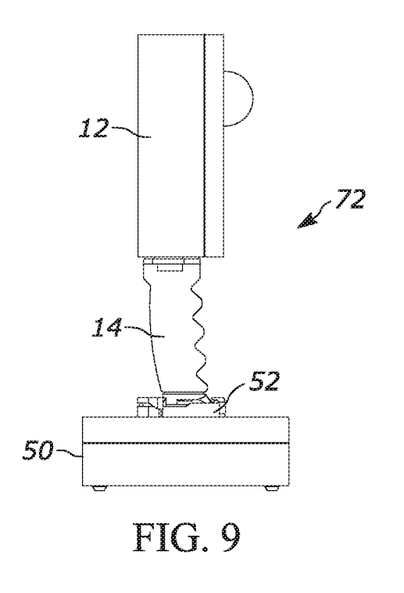
FIG. 9 is a second side view of the mobile video camera apparatus of FIG. 5.

The mobile video camera device 10 further includes a recording activation switch 36 (see FIG. 7) connected to an input relay 38. In at least some embodiments, the input relay 38 is a dry contact relay, while in other embodiments other types of relays can be utilized. The input relay 38 is connected to a recording activation input of the camera 18, wherein in at least some embodiments, activation of the switch 36 energizes the input relay 38, which in turn activates the camera 18 to start recording, with the recording continuing until the switch 36 is deactivated. In at least some embodiments, the mobile video camera device 10 is always powered on, but waiting for activation of the switch 36 to begin recording.

The mobile video camera device 10 also includes a wireless communication device 40 for providing wireless communication (i.e., transmitting and receiving). The wireless communication device 40 can transmit the data from the encoder 26 (i.e., encoded data) to the video management system 28 (when in range of a wireless network in communication with the video management system 28). The wireless communication device 40 also allows for communication to be sent from the video management system 28 to the camera 18, allowing for wirelessly altering the configuration and other settings of the camera 18 (e.g., changing the default recording resolution of the image sensor 20) via configuration commands. The wireless communication device 40 can communicate using one or more of various known technologies, such as dual band technology (802.11n and 802.11ac), etc. In at least some embodiments, the wireless communication device 40 is a TP Link Wireless Portable Nano Travel Router. An indicator lamp 42 can be provided on the housing 12 to annunciate when recording is activated and/or when charging power is being provided to the battery 30 via the housing power port 34.

The housing includes a first housing communication port 44 and a second housing communication port 46. The first housing communication port 44 is connected to the camera 18. The second housing communication port 46 is connected to the wireless communication device 40. By connecting a communication cable 48 between the communication ports 44, 46, the wireless communication device 40 is coupleable to the camera 18 to allow for wireless transmission of the encoded data to the video management system 28 (see FIG. 10). With the aforementioned configuration options, the mobile video camera device 10 can record and transmit encoded data in real-time when the wireless communication device 40 is in communication with the video management system 28, and can store the encoded data for later transmission when communication with the video management system 28 cannot be achieved.

Figure 4:
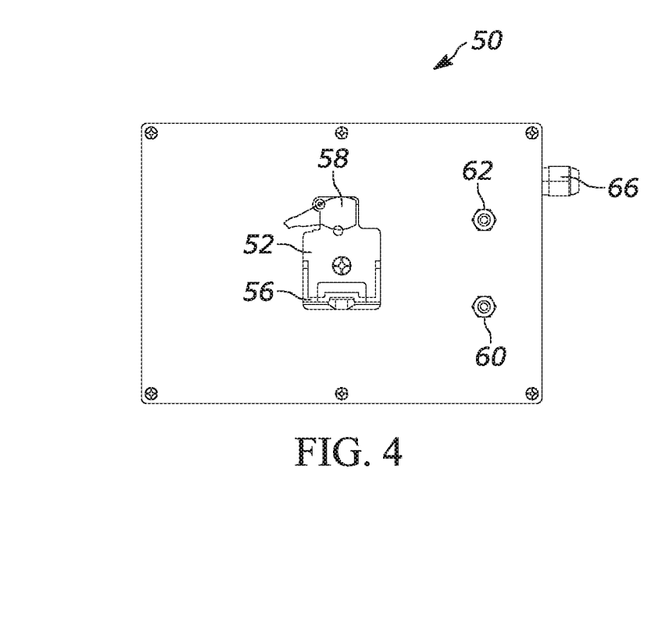
FIG. 4 is a top view of the base of FIG. 3.

Referring now to FIGS. 3 and 4, a base 50 is illustrated. The base 50 includes a handle mount 52 for receiving and securing a base engagement portion 54 situated at the second end 17 of the handle 14. In at least some embodiments, the handle mount 52 interfaces with the base engagement portion 54 to provide a tool-less coupling mechanism for securing and unsecuring the mobile video camera device 10 to the base 50. For example, in at least some embodiments, the handle mount 52 includes a U-shaped sleeve 56 and an opposing front cam 58, which can be selectively rotated to allow the base engagement portion 54 to be slid in and out of the sleeve 56, to selectively secure or unsecure the mobile video camera device 10 from the base 50.

In at least some embodiments, the base 50 further includes a base power output port 60 coupleable via a power cable 61 with the housing power port 34 to provide charging power to the battery 30. The base 50 can also include a base communication port 62 coupleable to the first housing communication port 44 using a communication cable 64. The base 50 can further include a pass-through port 66 for receiving a communication cable 68 (FIG. 10) that is connected to the base communication port 62 at the base 50 and to a network in communication with the video management system 28. The pass-through port 66 can also receive a power supply cable 70 (FIG. 10) that connects a source of outside power to the base power output port 60. In at least some embodiments, the handle mount 52 and base engagement portion 54 could include interfacing contacts to allow for power and/or communication connections therebetween, thereby eliminating the need for additional wired connections, such as power cable 61 and/or communication cable 64 when the mobile video camera device 10 is secured to the base 50. In such an embodiment, the base power output port 60 and housing power port 34 would be formed at the interfacing contacts. Likewise, the base communication port 62 and first housing communication port 44 could be formed at the interfacing contacts as well.

Referring to FIGS. 6-9, front, back and side views of a mobile video camera apparatus 72 is illustrated, comprising the combination of the mobile video camera device 10 and the base 50. Although the mobile video camera device 10 is shown in a secured position on the base 50, the mobile video camera device 10 is selectively removable, as discussed above. The portability of the mobile video camera device 10 provides a significant advantage over prior art by providing a secure recording device that can be used in a variety of situations where a fixed camera system would be not be of use, such as documenting an employee confrontation.

Figure 10:
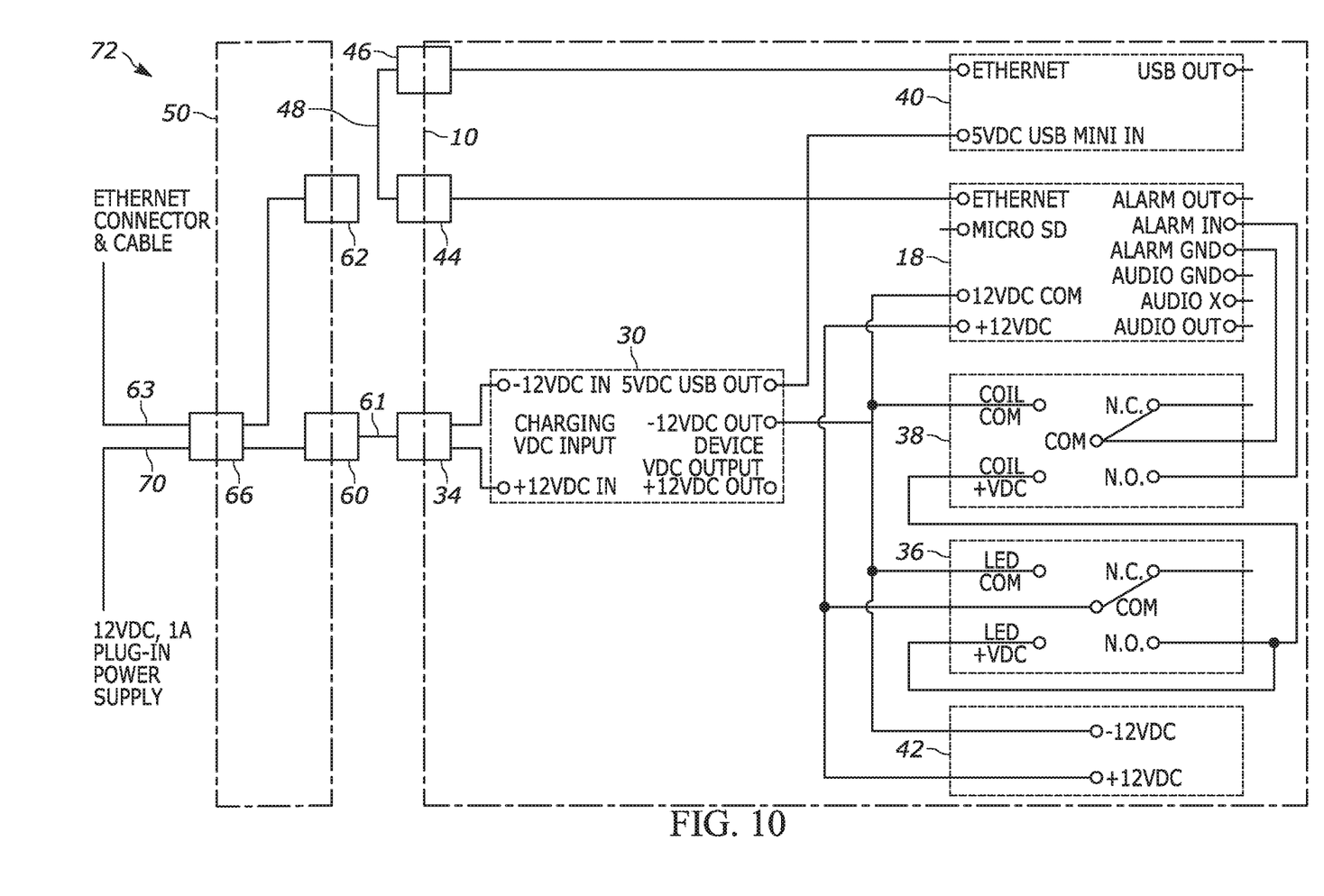
FIG. 10 is an exemplary wiring schematic for the mobile video camera apparatus in a first connection position.
Figure 11:
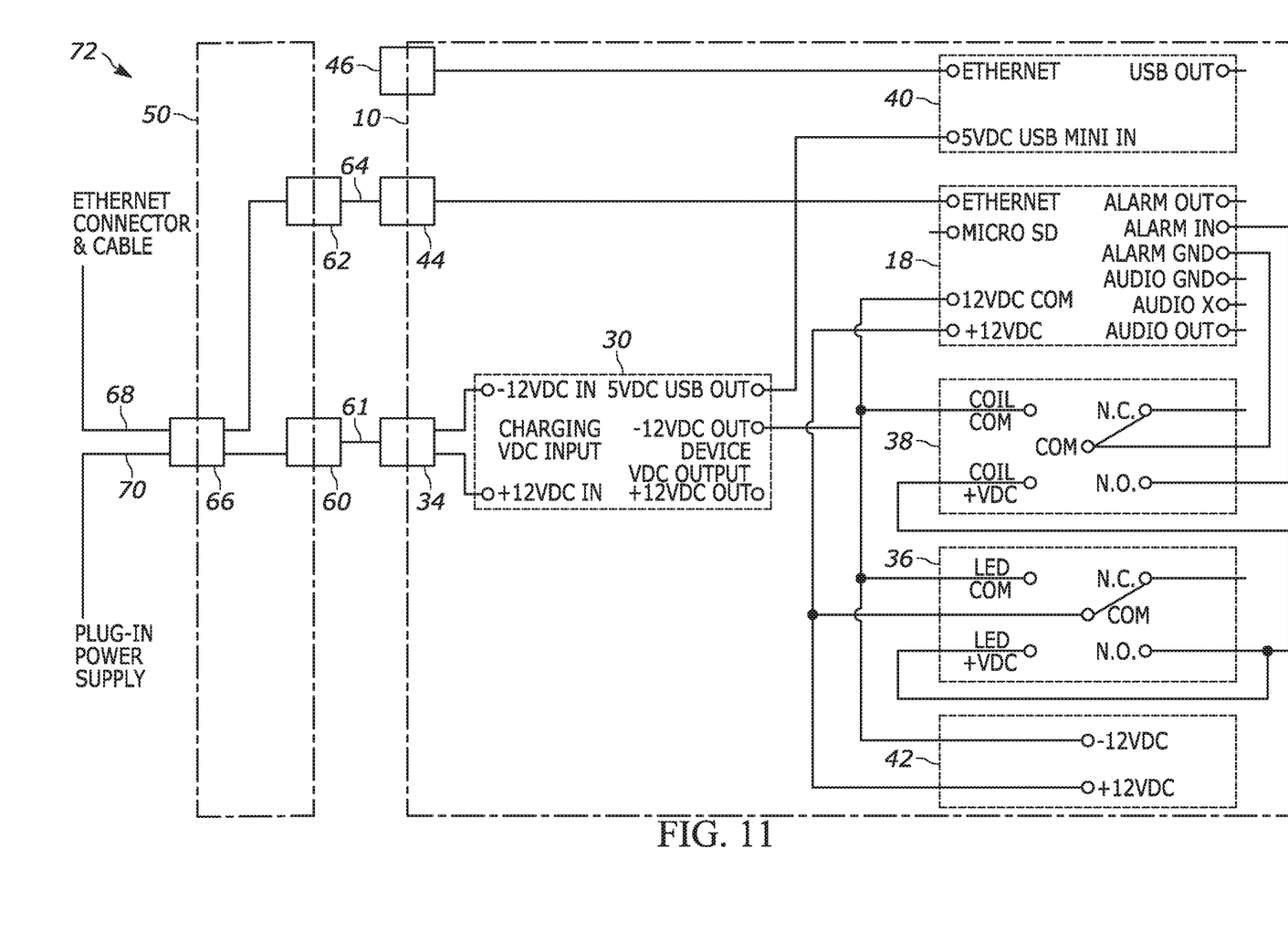
FIG. 11 is an exemplary wiring schematic for the mobile video camera apparatus in a second connection position.

Referring to FIG. 10 an exemplary wiring schematic for the mobile video camera apparatus 72 illustrating a first connection position with the communication cable 48 connected between the communication ports 44, 46, and the base power output port 60 connected via power cable 61 with the housing power port 34 is provided. FIG. 11 provides another exemplary wiring schematic for the mobile video camera apparatus 72, but in a second connection position, with the communication cable 48 connected between the communication port 44 and the base communication port 62. As described above, with the communication cable 48 connected between the communication ports 44, 46, the camera 18 can pass encoded data from the encoder 26 to the wireless communication device 40 for wireless transmission directly or indirectly (via a network) to the video management system, and with the communication cable 48 connected between the communication port 44 and the base communication port 62, the camera 18 can pass encoded data from the encoder 26 directly or indirectly (via a network) to the video management system via the wired connection 63. In at least some embodiments, the communication ports and cables described herein can comprise Ethernet ports and cables, although it shall be understood that other types of communication ports, cables, connectors, etc. can also be utilized in place of or in combination with ethernet components to perform the same end function of facilitating communication between components.

Figure 12:
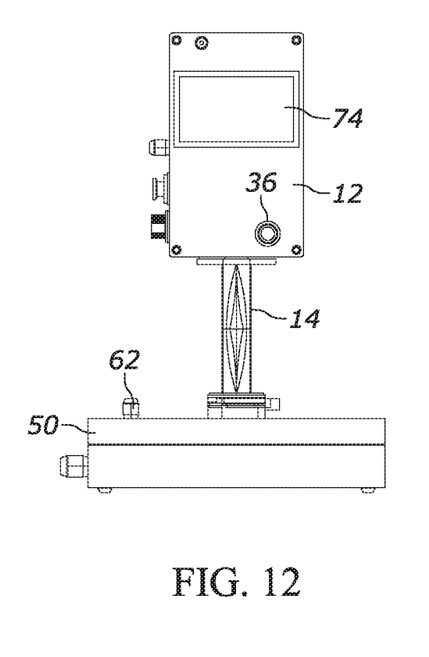
FIG. 12 is a front view of the mobile video camera apparatus with another exemplary embodiment of the mobile video camera device.

Referring to FIG. 12 in at least some embodiments, the mobile video camera device 10 can include a display 74, wherein the display 74 is secured or otherwise visible through the housing 12. The display 74 can include any one of various known or unknown displays used to convey information to a user (or provide inputs from a user), such as a touch screen or an LCD display, etc. The display 74 can be interconnected with the camera 18 to allow for viewing the live images being recorded. In addition, the display 74 can be interconnected with the battery 42 and/or wireless communication device 40 to display battery power level and/or wireless signal strength, among other things. The display 74 can also show the duration of current recording time and other details, such as resolution, frame rate, etc.

Figure 13:
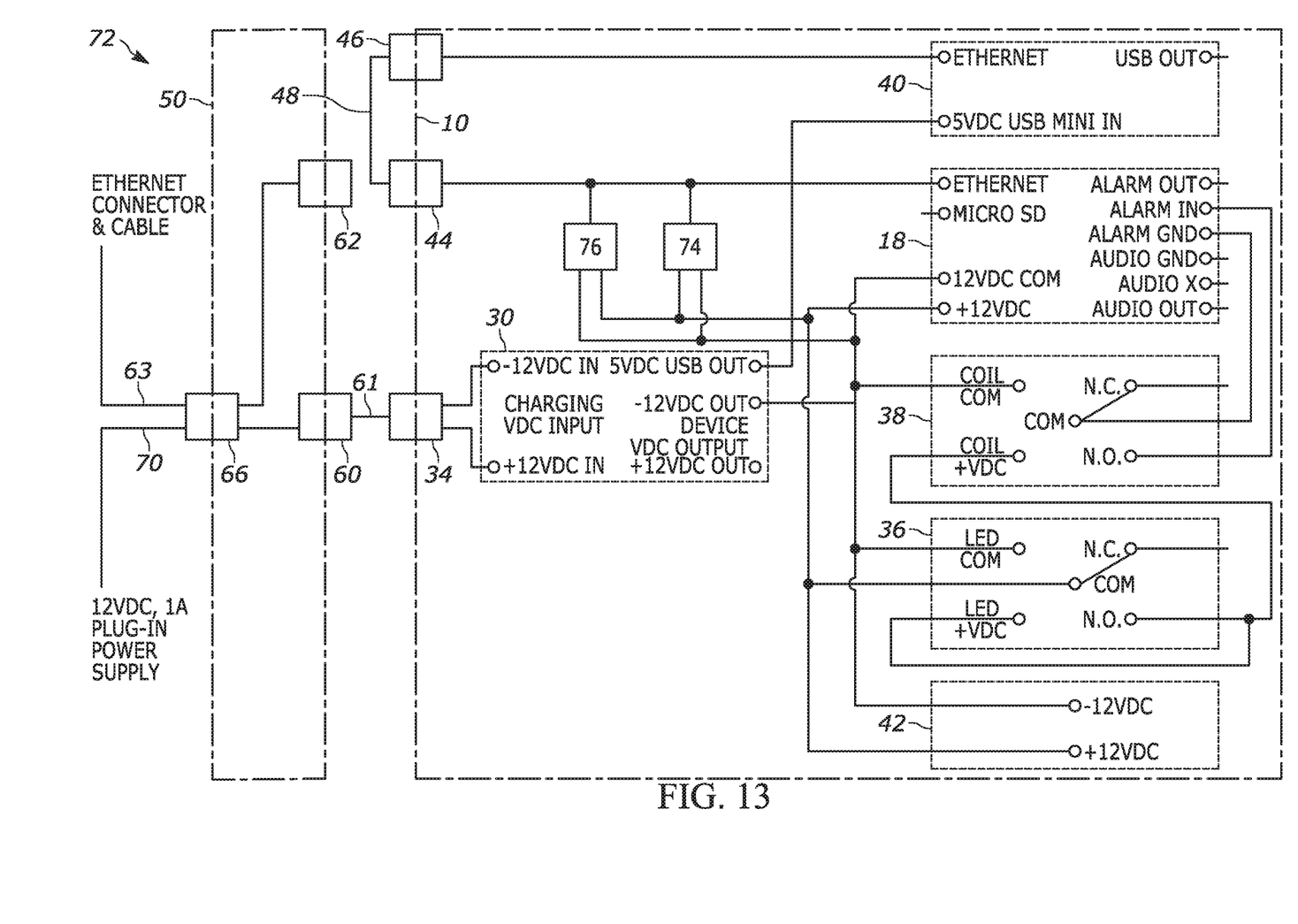
FIG. 13 is an exemplary wiring schematic for another embodiment of the mobile video camera apparatus that includes a display and a cellular communication device.

FIG. 13 is an exemplary wiring schematic for the mobile video camera apparatus that includes the interconnected display 74 and a cellular communication device 76. The cellular communication device 76 can provide a wireless connection to the video management system 28 when a wired or ethernet connection is not available. In at least some embodiments, the cellular communication device 76 is a cellular modem situated inside the housing 12 and interconnected with the camera 18 and battery 42. In at least some embodiments, an additional switching device can be utilized to couple and decouple the cellular communication device 76.

Although the invention is shown and described in various embodiments, it is to be understood that it is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein. Further, although certain advantages of different embodiments and disadvantages of certain prior art are described, no single claim must realize every or any benefit or overcome every or any disadvantage.

What is claimed is:

1. A mobile video camera apparatus comprising:
   a mobile video camera device comprising:
      a housing;
      a handle connected to the housing at a first end and having a base engagement portion at a second end:
      a camera including an image sensor, a lens, and an encoder for receiving and encoding data from the image sensor for transmission to a video management system;
      a battery;
      a recording activation switch;
      an input relay connected to the camera, wherein activation of the recording activation switch by a user energizes the input relay, and the input relay provides a signal to the camera to begin recording data;
      a wireless communication device coupleable to the camera device for transmitting encoded data from the camera to the video management system and for receiving configuration commands from the video management system; and
   a base comprising:
      a handle mount for receiving and securing the base engagement portion to the base, wherein the handle mount includes a tool-less coupling mechanism for securing and unsecuring the mobile video camera device to the base.

2. The apparatus of claim 1, wherein the housing further includes a first housing communication port connected to the camera and a second housing communication port connected to the wireless communication device and coupleable with the first housing communication port, for wirelessly transmitting encoded data in ONVIF compliant format from the camera device to the video management system and for receiving configuration commands from the video management system.

3. The apparatus of claim 2, wherein the base further includes a base communication port connected to the video management system and coupleable to the first housing communication port for wired transmission of encoded data from the camera to the video management system and configuration commands from the video management system to the camera.

4. The apparatus of claim 3, wherein the first housing communication port and second housing communication port are ethernet ports.

5. The apparatus of claim 4, wherein the base communication port is an ethernet port.

6. The apparatus of claim 1, wherein the input relay is a dry contact relay.

7. A mobile video camera apparatus comprising:
a mobile video camera device comprising:
- a housing;
- a handle connected to the housing at a first end and having a base engagement portion at a second end;
- a camera including an image sensor, a microphone, a lens, and an encoder for receiving and encoding data from the image sensor and microphone for transmission to a video management system;
- a battery;
- a housing power port connected to the battery for receiving charging power;
- a recording activation switch;
- an input relay connected to the camera, wherein user activation of the recording activation switch energizes the input relay, and the input relay provides a signal to the camera to begin recording data;
- a first housing communication port connected to the camera;
- a wireless communication device configured for communication with the video management system;
- a second housing communication port connected to the wireless communication device and coupleable with the first housing communication port for transmitting encoded data from the camera to the video management system; and a base comprising:
- a handle mount for selectively receiving and securing the base engagement portion of the handle to the base;
- a base power output port coupleable to the housing power port; and
- a base communication port coupleable to the first housing communication port.

8. The apparatus of claim 7, wherein the handle mount includes a tool-less coupling mechanism for securing and unsecuring the mobile video camera device to the base.

9. The apparatus of claim 7, wherein the first housing communication port, second housing communication port, and base communication port are ethernet ports.

10. A mobile video camera apparatus comprising:
a mobile video camera device comprising:
- a housing;
- a handle connected to the housing at a first end and having a base engagement portion at a second end;
- a camera including an image sensor, a lens, and an encoder for receiving and encoding data from the image sensor for at least one of storage in a memory device and transmission to a video management system;
- a battery;
- a recording activation switch;
- an input relay connected to the camera, wherein user activation of the recording activation switch energizes the input relay, and the input relay provides a signal to the camera to begin recording data;
- a wireless communication device coupleable to the camera device for transmitting encoded data from the camera to the video management system and for receiving configuration commands from the video management system; and a base comprising:
- a handle mount for receiving and securing the base engagement portion to the base, wherein the handle mount includes a tool-less coupling mechanism for securing and unsecuring the mobile video camera device to the base;
- wherein the housing further includes a first housing communication port connected to the camera and a second housing communication port connected to the wireless communication device and coupleable with the first housing communication port for wirelessly transmitting encoded data from the camera device to the video management system, and wherein the base further includes a base communication port connected to the video management system and coupleable to the first housing communication port for wired transmission of encoded data from the camera to the video management system.

* * * * *